Jan. 1, 1946. E. L. VIDAL ET AL 2,392,108
APPARATUS FOR MOLDING LAMINATED STRUCTURES
Filed Feb. 20, 1943
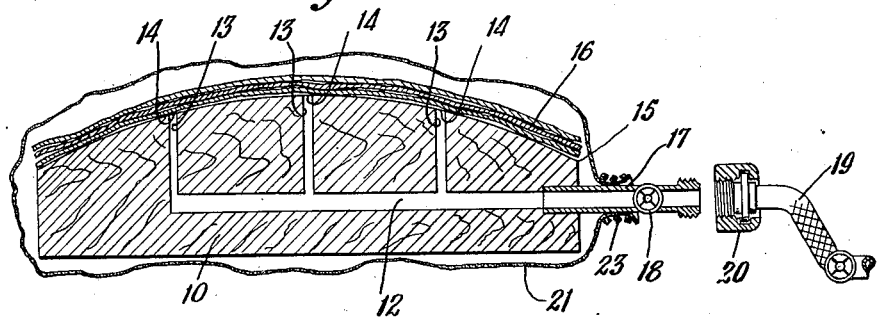
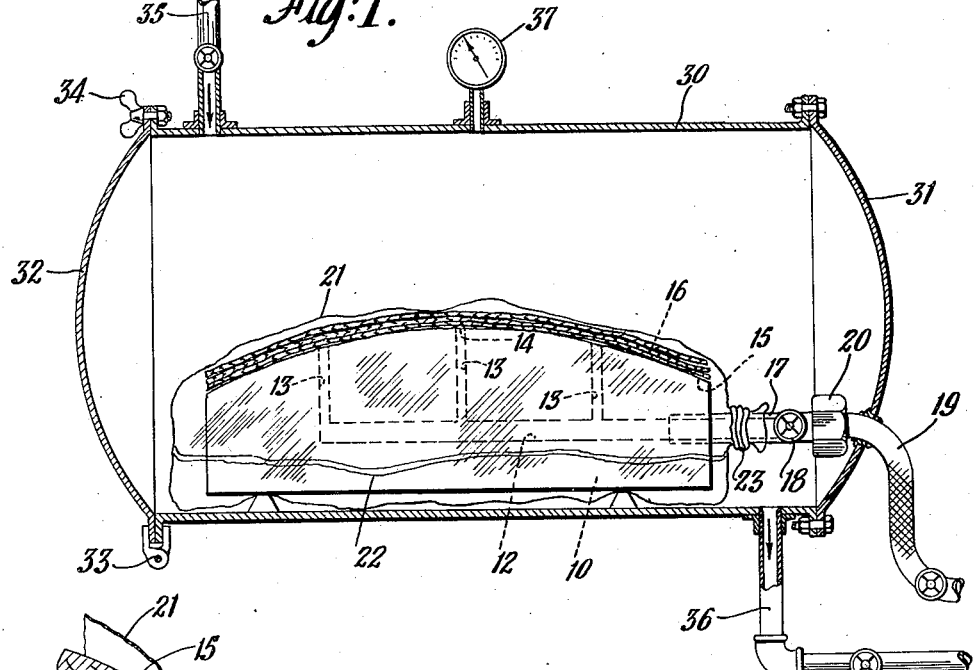
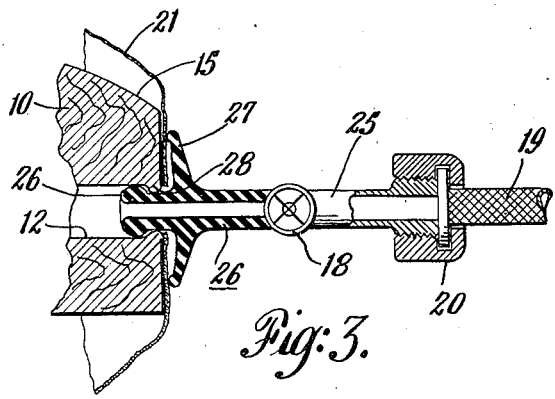
INVENTOR
EUGENE L. VIDAL
WILLIAM L. TAYLOR
ATTORNEY Patented Jan. 1, 1946

2,392,108

UNITED STATES PATENT OFFICE 2,392,108

APPARATUS FOR MOLDING LAMINATED STRUCTURES

Eugene L. Vidal, Washington, D. C., and William A. Taylor, Wildwood, N. J., assignors to Vidal Corporation, a corporation of Delaware Application February 20, 1943, Serial No. 476,538

1 Claim. (Cl. 144—281)

This invention relates to certain new and useful improvements in molding and in apparatus therefor.

Objects and advantages of the invention will be set forth in part hereinafter and in part will be obvious herefrom, or may be learned by practice with the invention, the same being realized and attained by means of the processes, steps and combinations pointed out in the appended claim.

The invention consists in the novel steps, processes, combinations and improvements herein shown and described.

The accompanying drawing, referred to herein and constituting a part hereof, illustrates one form of apparatus for carrying out the process of the invention, and together with the description, serves to explain the principles of the invention.

Of the drawing:

Figure 1 illustrates a typical and illustrative embodiment of this invention and is a view in side elevation with parts in section of molding apparatus in accordance with this invention;

Figure 2 is a view in section of certain details of the jacketed die assembly of apparatus of Figure 1; and, Figure 3 illustrates a modified embodiment of the jacketed die assembly of the apparatus of Figure 1 and is a fragmentary view in section thereof.

The present invention has for an object the provision of a new and improved molding method and apparatus therefor. The invention has for another object the provision of a method and apparatus such as the foregoing through the use of which material economies in the initial cost of equipment can be effected; equipment maintenance expenses can be reduced; inspection of the article being prepared for molding can be facilitated; a wide range of lighter, more easily handled and generally cheaper disposable materials is made employable; and, through the use of which method and/or apparatus a higher production rate can be realized.

Other and further objects of this invention are to provide a new and useful molding die; and, to provide a new and improved jacket for fluid pressure molding dies, which may be economically discarded after a single usage and which will obviate certain of the disadvantages found in jackets having a built in vent valve.

In general, molding apparatus in accordance with this invention comprises, among other things, an internally channelled molding die upon which moldable material is adapted to be assembled to form a molding die assembly.

The channelled construction of the molding die provides an internal venting conduit communicating with vent openings located in suitable number in the surface of the molding die. These openings function to permit fluid to escape through the die from a jacket in which the die assembly is adapted to be enclosed during the molding operation, as will be explained more fully hereinafter.

A nozzle member, which communicates with the internal venting conduit, extends from the molding die and provides a sealing structure employable to establish a common vent opening between the molding die and the jacket in which the die is enclosed during the fluid pressure molding operation.

The nozzle member may conveniently be formed as an extension of the molding die and be integral therewith. Preferably, however, and for reasons of simplicity in construction and facility in use, the nozzle member is separable therefrom and has one end removably lodged in the internal venting conduit of the die and, preferably, in tight fitting engagement with the molding die. The other extremity of the nozzle member is preferably constructed and arranged so that the nozzle may be separably coupled to conduit means leading through the walls of the pressure vessel in which the molding operation is conducted. Suitable valve means are provided in the nozzle member for shutting off fluid flow therethrough, at will.

Enclosure of the molding die assembly in its jacket is effected by placing the die assembly upon a thin sheet of membranous material and wrapping the die in the material, in any convenient fashion, so as to form a jacket having an open mouth through which the nozzle member extends.

Overlapping portions of the jacket are sealed together, for example, through the application thereto of casein glue, rubber cement or other suitable adhesive. Preferably, however, a self-sealing material is utilized which may be sealed to itself at the overlaps. In the latter case, the membranous material employed is preferably a transparent cellulosic material that may be sealed to itself by the application thereto of a hot iron. For example, the material known commercially as self-sealing Cellophane, is suitable for this purpose. On the other hand, a wide range of membranous materials which are not self sealing is available. For example, paper, closely woven fabric materials of a fluid impervious nature, Cellophane (non-self sealing) and many others are materials which are suitable. In either case, the jacket provides a substantially fluid-impervious membranous casing by means of which a uniform fluid pressure may be satisfactorily transmitted to the surface of the molding die, the jacket material being of a sufficiently cheap and plentiful nature as to permit the jacket being discarded after a single use. Materials such as the foregoing have strength characteristics enabling the jacket to be easily stripped and torn from the molding die upon completion of the molding operation, thereby obviating the slower and frequently difficult task of removing the die, particularly of the larger types, from the customary rubber jacket or blanket in which fluid pressure molding is conventionally conducted.

After the jacket has been formed and sealed, as above described, the space between the die and the jacket, adjacent the mouth of the latter, is sealed so as to provide a single vent opening common to the jacket and to the die. The nozzle member is utilized to achieve this result, which is accomplished, preferably, by gathering the jacket, at its mouth, about the nozzle member intermediate the ends of the latter and clamping the jacket and nozzle member to each other by bands of resilient material or by other suitable clamping means.

It will be noted that in case Cellophane or other suitable transparent material is employed for the jacket, the operator is enabled to see the die with the moldable material thereon and to make such adjustments of the jacket with relation thereto as may be deemed necessary to prevent unwanted tearing of the jacket during the molding operation to follow. In order to facilitate such adjustments, suction may be applied to the nozzle to collapse the jacket upon the assembly formed by the die and moldable material, the operator at this time manipulating the jacket, where necessary, to prevent folds or portions thereof from being caught between the die and moldable material, or between layers of the moldable material, particularly where the latter is comprised of thin layers of wood and/or fabric.

The jacket having been collapsed, the valve in the nozzle member may be closed and the jacketed die assembly placed in an auto-clave, or other form of pressure vessel, for the molding operation. The nozzle member is then coupled to a valved conduit leading through the walls of the pressure vessel so that the jacket may be vented to the atmosphere during the molding operation. The valve in the nozzle member is now opened (the valve in the conduit being closed), the vessel sealed and steam, air or other fluid pressure medium admitted until the desired molding pressure has been built up within the vessel. During this time the jacket is permitted to vent to the atmosphere through the die and the nozzle member, the molding pressure being maintained for the time requisite to complete the molding operation. Heat may be supplied to the vessel during this period, in any suitable manner.

Upon completion of the molding operation, the jacketed die assembly is removed from the vessel and the jacket removed from about the die. Removal of the jacket may be effected in the usual manner as by withdrawing the die assembly from the jacket. Preferably, however, the jacket is ruptured and forcibly torn or stripped from around the die assembly and is discarded since the material of which it is constructed, and the nature of the jacket makes such treatment economically feasible.

It will be understood that the foregoing general description and the following detailed description as well are exemplary and explanatory of the invention but are not restrictive thereof.

Referring now more particularly to the accompanying drawing, there is depicted in Figure 1 an internally vented molding die 10.

The molding die, as here embodied, has a header 12 from which extend a plurality of passageways 13, three in number, each terminating in a small opening 14 in the forming surface 15 of the die. It will be understood that any number of the openings 14 may be provided in the forming surface of the die and that similar openings may be provided in other surface portions of the die, as well.

Moldable material 16 is assembled on the die. As here embodied, thin sheets of wood veneer preferably coated with an adhesive are mounted one upon the other in cross-grained relationship, upon the die. The laminae thus formed are preferably temporarily secured to the die in any suitable fashion, as by staples or rubber bands (not shown).

A nozzle member 17 having a valve 18 intermediate its ends has one end lodged in the header 12 and snugly engages the die 10, preferably in removable sealing engagement therewith. The opposite free end of the nozzle is preferably threaded so that it may be removably coupled to a valved conduit 19, a threaded coupling nut 20 being carried on the conduit 19 for coupling the nozzle and conduit to each other in fluid-tight relationship. Thus, the header 12, the nozzle member 17 or 26 and the valved conduit 19 together form a main venting channel extending beyond and outside the die 10.

The die 10 and moldable material 16 together form a molding die assembly which is enveloped or encased in a jacket 21 formed from a sheet of thin flexible and preferably transparent material.

The jacket 21, as here embodied, is formed from a sheet of transparent and preferably moisture-proof Cellophane, of the type commercially known as heat-sealing. In forming the jacket, the die assembly is placed upon a sheet of the Cellophane of ample dimensions which is then manipulated about the assembly, much as would be done in wrapping a parcel, so as to form a jacket having an opening at one end only through which extends the nozzle member 17. The overlapping portions of the Cellophane which form the jacket seams, such as the seam 22, Figure 1, are carefully sealed to each other either by means of a suitable adhesive, or preferably, by pressing lightly with a hot iron thereby providing an enclosure heremetic or substantially hermetic save for the single opening constituting the mouth of the jacket.

The mouth portion of the jacket is then gathered around the nozzle member 17 and clamped thereto by means of bands of resilient material 23 thereby substantially tightly sealing the jacket mouth.

It will be observed that the nozzle member 17 functions to seal the space between the jacket 21 and the die 10 so as to establish a single vent opening common to the jacket and the molding die. Thus, when pressure is applied to the periphery of the jacket, the fluid medium within the jacket, and between the laminations of material 16, will be displaced and vented through the nozzle member via the openings 14.

An alternative structure for forming the common vent opening is depicted in Figure 3, wherein a valved nozzle member 25 is provided with a bulbous tip portion 26 of rubber or other resilient material and with an annular outstanding sealing flange 27 of the same material in proximate spaced relation thereto. The die 10 in this case is provided with an inwardly extending annular flange 28 located at the discharge end of the header 12, the tip portion 26 and flanges 27 and 28 of the nozzle being so proportioned and arranged that the nozzle member upon insertion in the header 12 will be in removable engagement with the die and have its flange 27 in firm sealing engagement therewith.

The nozzle member 25 is thus utilizable to clamp the jacket 21 to the die 10 so as to seal the space between the die and jacket and establish a vent opening common to both as is shown in Figure 3.

Referring again to the embodiment shown in Figures 1 and 2, it will be seen that the jacket 21 having been formed, sealed and clamped to the nozzle 17, suction may be applied to the nozzle to collapse the jacket upon the die assembly. Manipulation of the jacket may be carried out at this time, if necessary, to ensure that upon a subsequent application of a molding pressure folds or portions of the jacket are not caught between the laminae of moldable material 16 or between the laminae and die and do properly bridge gaps or traverse sharp edges of the die or laminae so as to minimize the possibility of tearing or otherwise rupturing the jacket during the molding operation to follow.

The valve 18 being closed the jacketed die assembly is placed within a pressure vessel 30 through whose walls the valved conduit 19 leads to the exterior of the vessel. The nozzle member 17 and conduit 19 are coupled by the nut 20 and valve 18 opened, a valve (not shown) in the conduit 19 being maintained closed pending application of the molding pressure.

The vessel 30 may be of any suitable form capable of withstanding pressures in the order of upwards of four atmospheres at elevated temperatures and may be equipped with any suitable form of pressure and temperature recording and controlling apparatus. As here embodied, the vessel 30 is preferably of cylindrical contour and is provided with end walls 31 and 32 of spherical contour, the latter being hinged as at 33 to provide a door having locking means 34 so that access may be had to the vessel and the vessel properly sealed.

Valved inlet and outlet pipes 35 and 36, respectively are provided for the admission and withdrawal of air, steam or other fluid medium under pressure, suitable pressure and/or temperature indicating apparatus 37 being provided as well.

Thus, it will be observed that upon the establishment of the requisite pressure condition within the vessel 30, a uniform fluid pressure will be applied to the jacket 21 and transmitted thereby to the moldable material 16 so as to cause the latter to conform throughout to the contour of the molding die 10 and to be fashioned into a laminated molded article of the desired shape and structure.

Upon completion of the pressure-temperature treatment, the door 32 is opened and the jacketed assembly removed from the vessel after uncoupling the nozzle member 17 from conduit 19.

The jacket 21 is now removed from the die assembly preferably by tearing or stripping the jacket material therefrom, the jacket thereupon being discarded since a new jacket may be constructed for each usage of the die.

The invention in its broader aspects is not limited to the specific parts, combinations, processes and steps shown and described but departures may be made therefrom within the scope of the accompanying claim without departing from the principles of the invention and without sacrificing its chief advantages.

What is claimed is:

Molding apparatus comprising in combination a molding die having an internal venting conduit connecting openings in the surface of said die; an open-mouthed jacket of membranous material enclosing said die; and, a nozzle member passing through the mouth of said jacket into said conduit to provide a vent opening common to said jacket and die, said member having a bulbous portion of resilient material sealingly engaging the walls of said conduit and having a flange portion of resilient material clamping said jacket to said die and sealing the space between said jacket and die adjacent the jacket mouth.

EUGENE L. VIDAL.
WILLIAM A. TAYLOR.